P. T. FIEHLER.
NUT LOCK.
APPLICATION FILED FEB. 17, 1921.
1,413,976.
Patented Apr. 25, 1922.
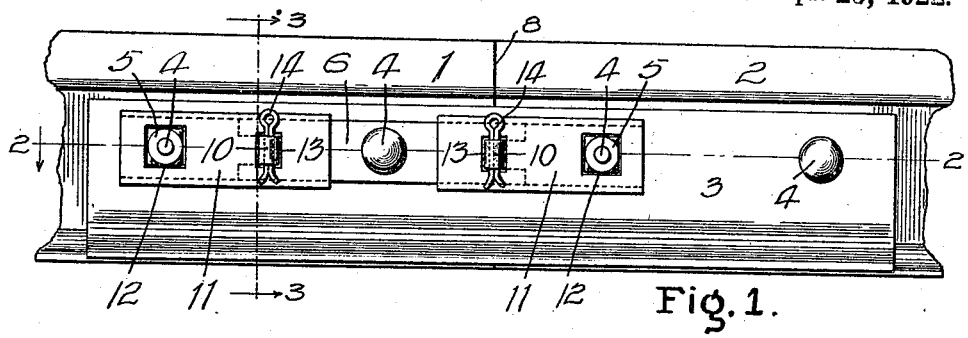
Fig. 1.
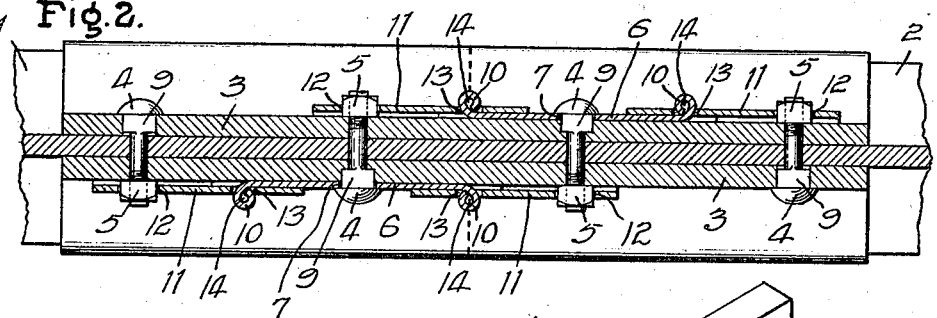
Fig. 2.
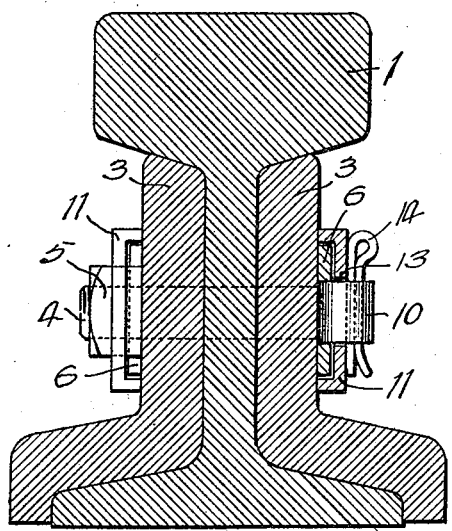
Fig. 3.
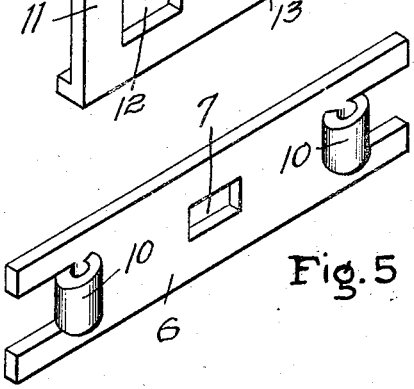
Fig. 4.
Fig. 5.
INVENTOR:
Paul T. Fiehler;
BY
ATTORNEY.

UNITED STATES PATENT OFFICE.

PAUL T. FIEHLER, OF MAPLEWOOD, MISSOURI.

NUT LOCK.

1,413,976.    Specification of Letters Patent.    Patented Apr. 25, 1922.

Application filed February 17, 1921. Serial No. 445,791.

*To all whom it may concern:*

Be it known that I, PAUL T. FIEHLER, a citizen of the United States, residing at Maplewood, in the county of St. Louis and State of Missouri, have invented certain new and useful Improvements in Nut Locks, of which the following is a specification.

My present invention relates to nut-locks, and the object of my invention is to provide a lock more particularly adapted to rail joints which will securely lock the nuts on alternate bolts upon both sides of the connected rails and hold the nuts against accidental rotation, or removal, thus positively holding the fish plates upon opposite sides of the connected rails in the proper position.

A further object of the invention is to provide a simple and inexpensive nut-locking device capable of being effectively applied to rail joints, especially where every other bolt is reversed so that the nut of one bolt is upon one side of the rail and the nut of the next bolt will be upon the opposite side of the rail, which is the latest method of arranging bolts and nuts used in rail joint connections.

A further object of the invention is the provision of a nut locking device capable of locking the nut upon the first and third bolt in a row by means of separate lock-plates and connecting the lock-plates through the medium of a third, or bearing plate, which is held in position by means of the second, or intermediate bolt in the row.

A still further object of the invention is the provision of means for connecting the lock-plates with the bearing plate to prevent accidental disconnection of the lock-plates therewith.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views:

Fig. 1, is a side elevation of a nut-lock device constructed in accordance with my invention.

Fig. 2, is a horizontal sectional view, taken on line 2—2 of Fig. 1.

Fig. 3, is a vertical sectional view, taken on line 3—3 of Fig. 1.

Fig. 4, is a detail in perspective of one of the nut-lock plates.

Fig. 5, is a detail in perspective of one of the bearing plates.

Referring to the drawings, the reference characters 1 and 2 indicate the meeting ends of two adjacent rails held against lateral displacement by means of the fish-plates 3. The fish-plates 3 are each securely fastened to the web of the rails 1 and 2 by means of the bolts 4 having the nuts 5 upon one end thereof. It will be observed that each alternate bolt passes through the fish-plates and rails in opposite directions so that the nuts of two bolts will be upon the inside of the rail, while two are upon the outside of the rail. This is the new arrangement now employed by railroads to avoid all nuts being sheared in case of accidents, as is manifest.

In carrying out the aim of my present invention, which is an improvement over my U. S. Letters Patent, Number 1,071,635, I employ a bearing plate 6 having a central opening 7 for the passage of one of the bolts 4 nearest the rail joint 8. This central opening is elongated so as to receive the flattened shoulder 9 of the bolts 4 to prevent the bearing plate 6 from rotary displacement from any cause. The bolt 4 carrying the plate 6 is intermediate two adjacent bolts, and the head of the bolt engages the plate 6, as shown in Figs. 1 and 2 of the drawings, for holding the plate in contact with the fish-plate. The ends of the bearing plate 6 are bifurcated so that the central lip portion may be rolled back to form a lateral projecting vertically disposed looped key holder 10 at each end of the bearing plate, as clearly shown in Fig. 5.

Each nut 4 is securely held against accidental rotation, or removal through the medium of a lock-plate 11 having a nut receiving opening 12 and a key holder receiving opening 13. The lock-plate 11 has its longitudinal edges bent rearwardly at a right angle to form a channel plate of the lock-plate to permit the lock-plate to straddle the bearing plate, as shown in Fig. 3.

As shown in Figs. 1 and 2, there is a lock-plate 11 for each bolt and nut 4 and 5, respectively. It will be observed that the nut 4 is receivable in the opening 12 and that the key holder is receivable in the opening 13 thereof. A suitable pin, or cotter key 14 is employed to pass through each key holder 10 and engage the outer face of the lock-plate 11 to prevent accidental removal of the lock-plate. It will be clearly seen from Figs. 1 and 2 of the drawings, that when the lock-plate is applied and the key 14 applied, that the nut 4 is securely held against any possible accidental displacement, rotation, or removal and that the lock-plate is held from displacement by means of the pin, or key 14.

For a rail joint, there are two sets of nut-lock devices employed, one upon each side of the rails, as shown in Fig. 2, thus it will be seen that each nut-lock device locks the nut of one bolt of each rail 1 and 2, as shown in Fig. 2.

From the foregoing description, it is evident that I have provided a nut-lock device, especially designed for rail-joints, although not necessarily limited thereto, and that the device is simple in construction, durable and that it can be readily and easily applied to a nut of a bolt, and removed without injury thereto, thus enabling the same nut locking device to be used over and over again.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the form, shape and particular arrangements of parts without departing from the spirit of my invention, hence I reserve the right to make any such changes, or modifications as may fairly fall within the scope of the appended claims when fairly construed.

What I claim is:

1. A nut locking device comprising a central apertured bearing plate held in position by the head of a bolt upon either side of a rail joint, a laterally extending loop formed at each end of said bearing plate, a pair of opposed lock plates each having an opening for the reception of the nut of a bolt on either side of the bolt holding the bearing plate and each lock plate also being provided with an opening for the reception of the looped ends of the bearing plate, and a pin carried by each loop to retain each plate in a locked position with the bearing plate and prevent accidental rotation of the nuts of the outer bolts during vibration of the parts connected by the bolts.

2. A nut locking device comprising a central apertured bearing plate held in position by the head of a bolt upon either side of a rail joint, a vertically disposed loop formed at one end of the bearing plate and extending laterally from the plate, the lock plate having an opening to receive the nut of an adjacent bolt and said plate having an opening for the passage of the looped end of the bearing plate for connecting the lock plate with the bearing plate, and a pin carried by the loop for holding the lock plate in a locked position to prevent accidental rotation of the nut.

In testimony whereof, I have hereunto signed my name to the specification.

PAUL T. FIEHLER.